Feb. 19, 1946.  E. H. LICHTENBERG  2,395,334
SCRAPER
Filed May 11, 1944
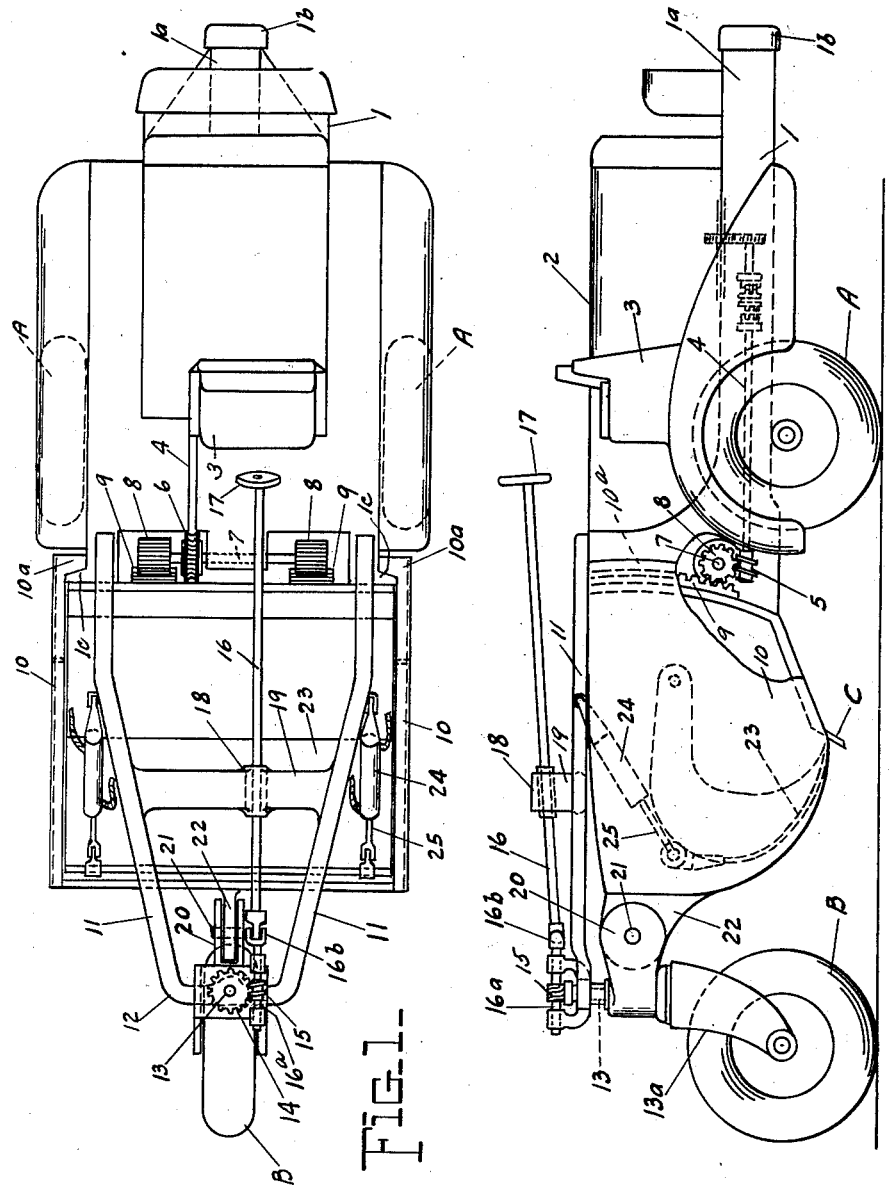
Inventor
E. H. Lichtenberg
By Robert Pass
Attorneys Patented Feb. 19, 1946

2,395,334

UNITED STATES PATENT OFFICE 2,395,334

SCRAPER

Erich H. Lichtenberg, Milwaukee, Wis., assignor to Koehring Company, Milwaukee, Wis., a corporation Application May 11, 1944, Serial No. 535,100

1 Claim. (Cl. 37—124)

My present invention relates to the art of dirt scraping machines known ordinarily as scrapers. The machine of the invention is of the type in which a scraper body is mounted upon the frame of a vehicle comprising usually front and rear wheels and a suitable motor or engine for operating the rear wheels for traction driving purposes. The improvements of my invention relate primarily to certain novel instrumentalities employed for raising and lowering the scraper body in relation to the ground level over which the scraper travels. The scraper body is ordinarily equipped with a scraper or cutting blade lowered to the ground for digging engagement therewith for accomplishing the scraping operation as the machine is driven forward under traction. Said body is raised in order to elevate the same from the ground level when the machine is traveling to and from the point of dumping or depositing of the earth scraped into the body. The raising and lowering instrumentalities of the invention are designed to quickly accomplish the desired movement of the scraper body to and from its position for scraping or digging action on the earth below, and said raising and lowering means are of such a nature as to be readily driven from the engine or motor of the scraping vehicle with ample power for accomplishing the desired results.

A preferred embodiment of my invention is illustrated in the accompanying drawing, in which:

Figure 1 is a top plan view showing generally a construction of scraper embodying the essential features of my invention.

Figure 2 is a side elevation of the same, a portion of the body and the rear vehicle frame unit being broken away in order to illustrate more clearly the manner of driving the gear racks by the driving pinions operated from the engine, in effecting the raising and lowering movement of the scraper body itself.

Referring to the drawing exemplifying a preferred embodiment of my invention as before stated, I note that the scraper vehicle illustrated therein comprises primarily a rear frame unit supported upon the rear ground wheels A and by the front ground wheel B. The front traction wheel is single, as illustrated, but it is within the purview of the invention to employ two wheels, if desired, this not being material to the invention.

The rear frame unit 1 of my vehicle will of course be equipped with a suitable axle unit, preferably of the differential type, adapted to be driven by the motor 2 which is conventionally illustrated, through the provision of any suitable driving connection between said motor and the said axle unit. The operator of the vehicle will be conveniently located at the seat 3 supported on the rear frame unit 1, and said unit 1 may be equipped at its rear end with an extension 1a having a pusher member 1b carried thereby through which the pushing force of a traction vehicle in rear of my scraping vehicle may be transmitted to the latter under certain conditions of service and representing known practice today in vehicle constructions of the type of my invention.

A power take-off shaft 4 leads from the engine 2 forwardly, on the rear frame unit 1, to a transverse drive shaft 7, and said drive shaft supports a worm gear 6 engaged with a worm 5 carried by the shaft 4, whereby to drive the shaft 7. On the shaft 7 are mounted one or more gears 8, two being illustrated, in the form of driving pinions, and the said gears 8, or pinions, are in mesh with vertical curved racks 9, toothed for the purposes of the engaging action with the pinions 8. The toothed racks 9 are secured to the rear side of the scraper body of the vehicle, the latter comprising the sides 10, formed at their rear ends with inwardly extending vertical and arcuate shaped protuberances or ribs designated 10a. The purpose of the members 10a is to interlock the front end portions of the frame unit 1 with the rear portion of the scraper body, and for the above purpose, the front portions of the unit 1 are formed with vertical arcuate shaped extensions 1c engaging the front side portions of the members 10a.

Extending forwardly from the extension 1c at the front of the rear frame unit 1, and disposed above the scraper body 10, is a rigid substantially horizontal frame comprising the sides 11 and the front cross bar 12. The vertical steering shaft 13 of the front wheel unit comprising the wheel B is mounted in the cross bar 12 of the frame 11 for bearing purposes, and is attached to the steering yoke 13a that spans the wheel B at opposite sides and above the same.

Keyed to the shaft 13 at its upper end is a worm wheel 14, and on a short steering wheel shaft section 16a is keyed a worm 15 engaging the worm wheel 14 and operable to turn the latter for steering effects upon the front wheel B. The shaft section 16a is connected by a universal joint 16b with the main steering shaft 16, at the rear end of which is carried the steering wheel 17 located proximate the seat 3 for the operator of the machine.

Intermediate the front and rear ends of the frame 11 is a cross bar 19 carrying a bearing member 18 in which the steering shaft 16 is journaled for free rotative movement.

The steering shaft 13 of the front wheel B is received in a combined bearing and supporting arm 20 which has a vertical bearing portion at its front end and is bifurcated at its rear end to receive therebetween a pivot arm 22 connected by the pivot 21 with the member 20.

The arm 22 is integrally or otherwise connected to the front of the body 10 of the scraper vehicle, and upward and lowering movements of the scraper body 10 are effected by pivotal action of the body about the pivot member 21 as an axis.

In accordance with conventional practice in the type of scraper vehicles to which my invention pertains, I utilize at the front open portion of the scraper body 10 the customary scraper C adapted to be lowered into digging engagement with the ground surface for scraping material therefrom into the scraper body 10 as the vehicle proceeds forward in its operation. Also conforming with known practice in the art, I employ for closing the front open portion of the scraper body 10, the customary gathering apron 23 pivoted at 24 to the sides of the body and at its front end extending transversely from side to side of the latter. Any suitable means may be employed for operating the gathering apron 23, those illustrated comprising common forms of hydraulic jacks including the cylinders 24 and the rods 25, the latter connected with pistons operating in the cylinders 24. As well known in the art, a suitable pressure fluid from a pressurized tank or other source on the vehicle may be supplied to opposite ends of the cylinders 24 for imparting positive reciprocal movement in opposite directions to the pistons in said cylinders and thereby raising and lowering the gathering apron 23. The last described instrumentalities are commonly known in the art and are not material to my invention other than to the extent that some means of this character must be employed in conjunction with my scraper body 10.

In respect to the power take off shaft 4, there may be employed any conventional type of reversing clutch means intermediate the engine shaft of the engine 2 and said power take off shaft 4 whereby to drive the latter in either of opposite directions.

The operation of my scraper vehicle may be briefly described as follows:

The operator has driven the vehicle to the point where scraping excavation is to be effected for the loading of the scraper body 10. He operates any conventional type of means for shifting the clutch devices by which the shaft 4 is driven to operate said shaft 4 in one direction for turning the shaft 7 and the pinions 8 to cause a lowering of the scraper body 10 until the scraper blade C is engaged with the ground. In this operation the pinions 8 of course by their engagement with the rack 9 effect a positive downward movement of the scraper body 10. Thereupon, by the operation of a suitable lever or control mechanism, the driving action of the engine 2 is transmitted to the rear wheels A of the vehicle whereby traction is obtained for moving the vehicle forward while the blade C is engaged with the earth. Before the forward movement of the vehicle just described the apron 23 will of course be disposed in an elevated position so that the scraper body may be open to receive the excavated material. The vehicle will be steered by the steering wheel 17 and when a load of material has been scraped from the earth and deposited in the major portion of the cubical receiving area of the scraper body 10, the apron 23 will be operated in the usual way to close the front end of the body 10. The shaft 4 will again be operated, but this time in a reverse direction to that last described, and the body 10 will be raised until the scraper C will be elevated from the ground, whereupon the vehicle may be driven at relatively high speed, under its engine drive, to the place of depositing of the excavated materials scraped into the body 10. At such place of deposit the apron 23 will be operated to open the same to the desired degree for dropping the materials from the body 10 in larger or lesser quantities dependent upon whether they are to be spread to any material extent.

Effectively speaking, therefore, it is to be noted that my scraper vehicle largely comprises the employment of a scraper body which is pivotally supported at its front end and capable of movement downwardly and rearwardly at its rear end. The said rear end of the body is slidingly connected with the front end portion of a rear frame unit, and the latter carries the operating instrumentalities for causing the pivotal upward and downward movement of the body 10 in order to raise and lower the same relatively to the ground. It is notable that the front end of the rear supporting unit of the vehicle is interlockingly as well as slidingly connected to the rear side or back of the body 10. If desired, roller bearings might be employed intermediate the parts 1c and 10a at opposite sides of the vehicle in order to facilitate the relative sliding movement between the parts 10 and 1. In the forward movement of the vehicle the parts 10a and 1c so cooperate that the latter afford a means of readily transferring the pushing forces of the rear traction unit 1 to the scraper body 10 and the front steering wheel supporting means of the vehicle.

Having thus described my invention, what I claim as new and desire to secure by Letters Patent of the United States, is:

In a scraper vehicle, in combination, a front wheel unit, a wheeled rear frame unit supported at its front end on the front wheel unit and having at opposite sides thereof relatively long arcuate extensions projecting outwardly and disposed in a generally vertical direction, a scraper unit including a body pivoted at its front end on the front wheel unit and provided at its opposite sides at the rear end thereof with relatively long inwardly extending arcuate ribs spaced from the back of the body and extending in a generally vertical direction corresponding with that of the said arcuate extensions, said extensions being received between the ribs and back of the body and slidable with arcuate movement in a generally vertical direction incident to raising and lowering of the body and adapted to transfer the forward pushing forces of the rear unit to the scraper body, means operable to raise and lower the body relatively to the rear wheel unit and causing relative sliding engagement of said extensions and ribs, and power means on the rear unit for driving the same forwardly to effect scraping or conveying operations of the body.

ERICH H. LICHTENBERG.